2,907,729
Patented Oct. 6, 1959

2,907,729
EPOXIDE, DIPHENOLIC ACID ALDEHYDE CONDENSATES

Sylvan Owen Greenlee, West Lafayette, Ind., assignor to S. C. Johnson & Son, Inc., Racine, Wis.

No Drawing. Application August 8, 1958
Serial No. 753,867

10 Claims. (Cl. 260—19)

This invention relates to new compositions resulting from the reaction of epoxides and aldehyde condensates to give valuable compositions for use in the manufacture of coating compositions, molding compositions, adhesives, etc. The aldehyde condensates contain reactive hydrogen containing groups including hydroxyl and carboxyl groups. These groups react with the epoxide compositions which contain an average of more than one epoxide group per molecule. The compositions include the initial reaction mixtures as well as intermediate and final reaction products derived therefrom.

An object of this invention is to provide new admixtures containing polyepoxides and aldehyde condensates having carboxyl groups and other active hydrogen containing groups so that they may undergo reaction to form polymer products of varying complexity.

Another object of this invention is to provide from the reaction of polyepoxides and aldehyde condensates having carboxyl and other active hydrogen containing groups new compositions which are valuable in the manufacture of protective coatings, films, molded articles, adhesives, etc.

The foregoing and other objects and advantages are attained by the present invention, various novel features of which will become more fully apparent from the description, with particular reference to specific examples which are to be considered as illustrative only.

In general, the compositions of this invention are prepared by reacting condensates of phenolic acids and aldehydes, particularly formaldehyde, having reactive hydrogen containing groups including carboxyl groups, with polyepoxide compositions containing an average of more than one epoxide group per molecule and are free from functional groups other than epoxide or hydroxyl. The active hydrogen containing condensates react with the epoxide groups of the polyepoxide compositions to form polymer products of varying complexity.

OPERABLE ALDEHYDE CONDENSATES

The aldehyde condensates employed in this invention are prepared by the condensation of aldehydes with phenolic acids such as those described in prior copending application Serial No. 534,405, filed September 14, 1955, entitled "Phenolic Acid, Aldehyde Condensates."

The phenolic acids employed must have two hydroxyaryl groups attached to a single carbon atom. The preparation of such an aryloxy acid is most conveniently carried out by condensing a keto acid with the desired phenol. To the best of applicant's knowledge, any keto acid or ester is operable in which a keto group is connected to a carboxy or carboalkoxy radical through an alkylene radical of at least 2 carbon atoms; however, experience in the preparation of bisphenol and related compounds indicates that the carbonyl group of the keto acid should be positioned next to a terminal methyl group in order to obtain satisfactory yields. Further, while a broad class of acids is contemplated such as the keto substituted pentanoic, hexanoic and heptanoic acids, the pentanoic acid, levulinic acid, is preferred since it is readily available.

Prior applications, Serial Nos. 464,607 and 489,300 filed October 25, 1954, and February 18, 1955, respectively, disclose a number of illustrative compounds suitable for use as the diphenolic acid and methods of preparing the same. These materials which are referred to for convenience as biphenolic acids Diphenolic Acid or by the trade name DPA, consist of the condensation products of levulinic acid and phenol, substituted phenols or mixtures thereof. It is to be understood that the phenolic nuclei of the diphenolic acid may be substituted with any group which will not interfere with the reactions contemplated herein. Such groups are the halo, nitro and alkyl groups of 1 to 5 carbon atoms. The chloro and bromo phenols are the preferred halogenated materials although it is possible to condense fluoro substituted phenols with a keto acid. Biphenolic acids derived from substituted phenols such as the alkylated phenols are sometimes more desirable than the products obtained from unsubstituted phenols due to properties imparted by the substituted groups. For instance, the alkyl groups provide better organic solvent solubility, flexibility and water resistance. However, the unsubstituted product is usually more readily purified. In the before mentioned condensation reaction between the phenol and keto acid it has been found, as one would expect, that the reaction occurs so that the phenolic hydroxyl group of the biphenolic acid is in a position para or ortho to the point of attachment of the hydroxyaryl radical to the pentanoic acid. Very little or no condensation occurs at the meta position.

Suitable aldehydes operable in the subject condensates are the low molecular weight mono-aldehydes such as formaldehyde, acetaldehyde, propionaldehyde, n-butyraldehyde, isobutyraldehyde, valeraldehyde, furfural, etc. However, because of commercial availability as well as its greater reactivity, formaldehyde is preferred. It is to be understood, however, that any aldehyde reactive with a phenolic compound is operable for purposes of this invention.

The diphenolic acid reacts with the aldehydes, for example, formaldehyde, to yield initially an alkylol condensation product which can be illustrated by the following formula representing the alkylol condensation product of 1 mol of 4,4-bis(4-hydroxyphenyl) pentanoic acid and 2 mols of formaldehyde:

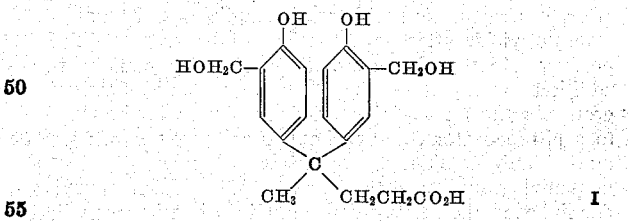

In the condensation reaction with aldehydes, the phenolic hydroxyl groups serve to activate the aromatic nuclei at the ortho and para positions with respect to the hydroxyl groups. Addition, therefor, occurs primarily at these positions. The Diphenolic Acid, 4,4-bis-(4-hydroxyphenyl)pentanoic acid, has two such hydrogen-containing carbon atoms in each of the aromatic nuclei of the acid, so that up to 4 mols of aldehyde may be reacted readily with each mol of acid. In those cases where alkyl groups or halides have been substituted in the aromatic nuclei of the acid, for appreciable condensation to take place, the substitution should not be so complete as to remove all hydrogen atoms from these ortho and para positions. These alkylol condensates are converted to polymers by the application of heat, the molecules of Diphenolic Acid combining with each other through methylene bridges to form polycarboxylic acids. In those cases where alkylol form is prepared with the addition of aldehyde to substantially all the free ortho and para positions in the acid, polymerization occurs with the splitting off of alkylol groups and the liberation of aldehyde. A typical polymerization reaction might be illustrated as follows:

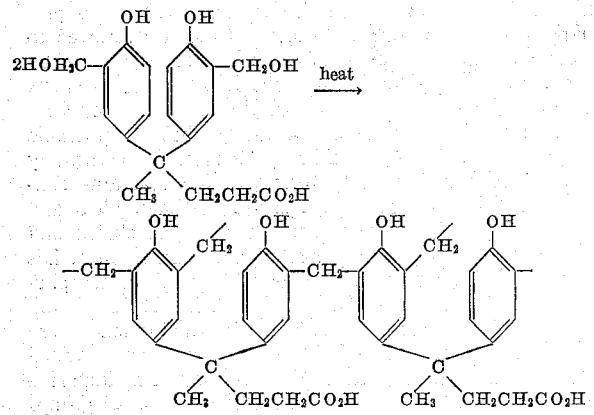

Slightly modified products may be obtained by using the Diphenolic Acid in combination with other materials capable of condensing with an aldehyde. Such materials may be illustrated by the mononuclear, polynuclear, monohydric or polyhydric phenols or ammonia derivatives containing at least one >NH group, with at least one of the free valency bonds of the nitrogen atom being attached to a carbon atom and the remaining valency bond to carbon or hydrogen. Exemplary phenols are hydroxybenzene, the cresols, xylenols, butylphenol, naphthols, and bis(4-hydroxyphenyl) isopropylidene. Operable ammonia derivatives can be illustrated by primary and secondary amines, amides, or derivatives thereof. These materials, referred to herein as modifiers, may be first partially condensed with aldehydes and then admixed with a partially condensed mixture of diphenolic acid and aldehyde to yield, after further condensation, valuable complex products. The further condensation referred to can occur by simply admixing the condensates and heating or by admixing the condensates with a polyepoxide, applying the admixture to a suitable substrate such as glass or tin and heating, the conversion reaction taking place directly on the substrate. Alternatively, these materials may be admixed prior to condensation with a Diphenolic Acid and aldehyde to yield, after condensation a similarly modified product. In such instances, the condensates contain, in addition to alkylol hydroxyl groups, phenolic hydroxyl groups, groups containing an active hydrogen attached to a nitrogen atom, and carboxylic acid groups. In the more highly condensed condensates where most of the methanol groups have been dehydrated to form methylene linkages, the compositions contain primarily phenolic hydroxyl and carboxylic acid groups.

The aldehyde condensates described hereinabove are in general, partial and intermediate reaction or condensation products of aldehydes and biphenolic acids or condensation products of aldehydes, biphenolic acids and modifying materials. It is important that the condensation is not carried so far as to produce an infusible and insoluble material. In general the condensate can be in its monomeric form, which is essentially an alkylol or polyalkylol product or it can be quite highly condensed. It is suitable as long as it is still fusible and soluble in or compatible with the epoxide composition.

Reactions of the Diphenolic Acid with an aldehyde, and if desired a modifier, can be conveniently carried out by processes known in the art. For example, the reaction between a Diphenolic Acid and formaldehyde will proceed readily at from 40 to 60° C. without a catalyst. However, since the reaction is quite slow, as a more practicable application either an acid or an alkaline catalyst is used to accelerate the reaction. By choosing a specific catalyst, one can obtain some control of the type of product formed. The most effective acid catalysts are oxalic, sulfuric, para-toluenesulfonic, and hydrochloric acids, but in some instances acid salts are also operable. Further, a variety of basic materials may serve as catalysts. These include sodium hydroxide, zinc oxide, ammonia, morpholine, and other amines. When the reaction is finished the reaction mixture can be neutralized, if an excess of acid or alkali were used, and subsequently washed with water. However, in many instances, it is not necessary to neutralize the reaction mixture and a simple decantation of the aqueous layer is sufficient.

The decision to choose an acid or basic type catalyst is based primarily on the use for which the resin is intended and the amount of formaldehyde that is to be combined with the phenolic material. In general it can be said that the rate of reaction with an alkali catalyst is much slower than an acid catalyst, and therefore, tends to form methylol groups rather than methylene linkages. For this reason higher ratios of the aldehyde can usually be used when a basic catalyst is employed.

The temperature range for the reaction is not critical and depends to a large extent on the reactants and solvent system used as well as the catalyst employed. If relatively low rather than higher temperatures are employed, the reaction takes a relatively longer time to go to completion. Although the temperature of the reaction is relatively non-critical, the reactions are preferably carried out at temperatures ranging from 40 to 110° C. or at reflux temperatures. Further, the condensation can be carried out with or without the presence of organic solvents and alone or in combination with other reactants. In certain cases where the Diphenolic Acid and modifying material used in the reaction are fairly insoluble in water it may be desirable to use organic solvents to carry out the reaction. In addition, in those instances where the condensate is used together with other materials in the production of complex products, it is possible to carry out the condensation reaction simultaneously with other reactions, for example, a mixture of Diphenolic Acid, aldehyde and a polyepoxide resin will form a suitable composition for certain applications.

Proportions of aldehyde to phenolic acid can vary from about 0.5 mol of the aldehyde per mol of acid up to about 4 mols of the aldehyde to 1 mol of the acid. It is to be understood that as the ratio of the aldehyde is increased, the complexity of the resultant polymer is also increased. Further, part of the phenolic acid can be replaced by materials reactive with an aldehyde, as hereinbefore described. Usually it is not desirable to replace more than about 80 percent of the phenolic acid with a modifier since with larger percentages the advantageous properties imparted by the acid are, to a large extent, lost.

The following examples illustrate the aldehyde condensates used in this invention. However, it should be understood that the invention is not intended to be limited thereby. Proportions expressed are parts by weight unless otherwise indicated. Acid values as used herein represent the number of milligrams of KOH required to neutralize a 1 gram sample.

Examples 1 to 8 inclusive, illustrate the preparation of phenolic acid-aldehyde condensates. Example 9 describes the preparation of a condensation product from a mixture of a phenol, Diphenolic Acid and an aldehyde. Examples 10 to 12 inclusive, describe the preparation of phenol-aldehyde condensates using butyl phenol, 4,4-bis(4-hydroxyphenyl) isopropylidene and phenol. Examples 13 to 17 inclusive, describe the preparation of typical ammonia derivative-aldehyde condensates. The condensation of Examples 10–17 inclusive, are useful in conjunction with the condensates of Diphenolic Acid in the manufacture of complex reaction products as hereinbefore described.

*Example 1*

In a flask provided with a mechanical agitator and a reflux condenser was placed 143 parts of 4,4-bis(4-hydroxyphenyl) pentanoic acid and 80 parts of formalin (38% aqueous formaldehyde), and the resulting mixture refluxed for a period of 1½ hours. The water was removed by reducing the pressure with a water aspirator and heating the mixture with continuous agitation to a temperature of 95° C. The resulting product, amounting to 145 parts, had an acid value of 165. The product was dissolved in methyl ethyl ketone to give a non-volatile content of 50%.

*Example 2*

A mixture of 286 parts of 4,4-bis(4-hydroxyphenyl) pentanoic acid, 172 parts of formalin, and .7 part of oxalic acid was refluxed for 1 hour. The water layer was removed by decantation and the phenolic resin layer washed three times with hot water. The residual resin layer was finally dried by heating to a temperature of 100° C. using a water aspirator vacuum. The product, amounting to 356 parts, had an acid value of 135. The product was dissolved in methyl ethyl ketone to a non-volatile content of 50%.

*Example 3*

A mixture of 286 parts of 4,4-bis(4-hydroxyphenyl) pentanoic acid, 172 parts of formalin, and 1.5 parts of sodium hydroxide was refluxed for a period of 1 hour. The product was freed from water by distillation at a temperature of 100° C. (pot temperature) using a water aspirator vacuum. The product, having an acid value of 169, amounted to 318 parts. This product was dissolved to a non-volatile content of 50% in methyl ethyl ketone.

*Example 4*

A mixture of 286 parts of 4,4-bis(4-hydroxyphenyl) pentanoic acid, 258 parts of formalin, and 1.5 parts of sodium hydroxide was refluxed for a period of 1 hour. The product was freed from water by vacuum distillation using a water aspirator, heating the mixture to a temperature of 97° C. The product, having an acid value of 151 and amounting to 361 parts, was dissolved in methyl ethyl ketone to give a 50% non-volatile content.

*Example 5*

A mixture of 286 parts of 4,4-bis(4-hydroxyphenyl)-pentanoic acid, 258 parts of formalin, and .7 part of oxalic acid was refluxed for a period of 1 hour. The water layer was removed by decantation and the organic resin layer washed three times with hot water. The organic resin layer was finally freed from the last traces of water by vacuum distillation using a water aspirator heating the reaction mixture to a temperature of 94° C. The resulting product, amounting to 343 parts and having an acid value of 131, was dissolved in methyl ethyl ketone to give a non-volatile content of 50%.

*Example 6*

A mixture of 94 parts of Diphenolic Acid prepared from ortho cresol and levulinic acid in the manner described in my copending application, Serial No. 489,300, 48 parts 37% formaldehyde and 0.5 part sodium hydroxide was charged to a 3-necked flask equipped with a thermometer, mechanical agitator, and reflux condenser. The charge was heated to reflux and held for 1 hour. The reaction mixture was allowed to cool and the water layer decanted. The final trace of water was stripped off under vacuum. The resultant product was a viscous resinous material having an acid value of 129 and a softening point of 25–30° C.

*Example 7*

Dichloro DPA was prepared by charging 363 parts of the ethyl ester of 4,4-bis(4-hydroxyphenyl) pentanoic acid and 344 parts of sulfonyl chloride to a 3-necked flask equipped with thermometer, reflux condenser, and mechanical stirrer. The reaction immediately exothermed and was cooled with a water bath maintaining the temperature at approximately 25° C. for 1 hour. The re-action charge became thick and then solidified with a pronounced temperature rise. The reaction mixture had a yellow color. Excess sulfonyl chloride was removed under slight pressure. The obtained ester had a chlorine content of 21.38% corresponding to the addition of approximately 2 chlorine atoms (theoretical equals 18.5%). The chlorinated ester was saponified to obtain the corresponding acid.

35 parts of dichloro DPA, 32 parts of 37% formaldehyde and 0.4 part sodium hydroxide were charged to a 3-necked flask equipped with thermometer, reflux temperature and held for approximately 3 hours. The reaction mixture was allowed to cool and 100 parts of cold water were added before neutralizing with dilute hydrochloric acid. A gummy resinous precipitate formed. The water layer was decanted and the resin washed 3 times with 60° C. water. The resin was dissolved in 150 ml. of dioxane and filtered to remove insoluble inorganic salts and subsequently stripped under slight pressure to remove final traces of solvent. The product was a resinous solid having an acid value of 128 and a softening point of 55–68° C.

*Example 8*

Dinitro DPA was prepared by charging 172 parts DPA and 450 parts glacial acetic acid to a 3-necked flask equipped with a thermometer, reflux condenser, and mechanical stirrer. The resultant solution was tan in color. 264 parts of benzene were added to the charge before cooling to 0° C. in an ice bath. At this temperature, drop-wise addition of 85.8 parts 70% nitric acid diluted with 66 parts of glacial acetic acid was begun. The complete addition required 3 hours and 45 minutes, with the reaction temperature never exceeding 0° C. The reaction charge at the end of the addition was a clear dark reddish solution. The charge was allowed to stir at temperatures between 5 and 20° C. for approximately 12 hours. At the end of this time, a heavy orange precipitate had formed. The precipitate was filtered and washed 3 times with distilled water before it was vacuum dried. The resultant crude material recovered at 84.5% of theoretical, had an acid value of 488 (theoretical=447) and a melting point 102–4° C. The crude material was recrystallized from a mixture of hot ethanol and water to give a fine yellow crystalline material having a melting point of 137.5–140° C., a nitrogen content of 7.20% (theoretical equals 7.44%) and an acid value of 445.

19 parts of dinitro DPA and 8 parts of 37% formaldehyde and 25 parts concentrated hydrochloric acid were dissolved in 100 ml. of dioxane. The mixture was charged to a 3-necked flask equipped with thermometer, reflux condenser, and mechanical agitator. The charge was heated to reflux and held for approximately 5 hours. The reaction mixture was allowed to cool and the aqueous layer removed by decantation. The dioxane solution was transferred to a distillation setup and the dioxane stripped off under slight vacuum. The resultant product was a resinous solid having an acid value of 367 and a softening point of 29–39° C.

*Example 9*

A mixture of 71.5 parts of 4,4-bis(4-hydroxyphenyl)-pentanoic acid, 57 parts of bis(4-hydroxyphenyl)-isopropylidene, 80 parts of formalin, and .32 parts of oxalic acid was refluxed for a period of 1 hour and 20 minutes. The water layer was removed by decantation and the organic resin layer washed two times with hot water. The organic resin layer was then freed from the last traces of water by heating with a vacuum using a water aspirator, heating the mixture to a temperature of 98° C. The resulting product, having an acid value of 79, was dissolved in methyl ethyl ketone to a non-volatile content of 50%.

*Example 10*

A mixture of 1000 parts of p-tert-butylphenol, 1067 parts of formalin, and 10 parts of sodium hydroxide was refluxed for a period of 1 hour at 95° C. The water layer was removed by decantation and the resulting organic layer washed twice with hot water. The phenol-formaldehyde resin layer was dehydrated by reducing the pressure with a water aspirator and heating the mixture at 50° C. The resulting dehydrated syrupy product amounted to 1470 parts.

*Example 11*

By a similar process to that described in Example 10, a mixture of 912 parts of 4,4-bis(4-hydroxyphenyl)-isopropylidene was treated with 960 parts of formalin and 2.28 parts of oxalic acid to give 1065 parts of a syrupy product.

*Example 12*

By the same procedure as that used in Example 10, a mixture of 658 parts of phenol, 1400 parts of formalin, and 6.6 parts of sodium hydroxide gave 1168 parts of a syrupy product.

*Example 13*

In a 3-liter 3-neck flask provided with a mechanical agitator, a thermometer, and reflux condenser was placed 120 parts of urea, 600 parts of 37% aqueous formaldehyde, and 1040 parts of n-butyl alcohol. With continuous agitation the reaction mixture was heated to reflux temperature and the refluxing continued for a period of 1 hour. At this point a water trap was placed between the reflux condenser and flask and filled with toluene. Distillation was continued until 315 parts of water were removed from the reaction mixture. The resulting mixture was cooled to room temperature, filtered, and 1030 parts of a clear, water-white, syrupy liquid isolated.

*Example 14*

The procedure of preparation including the water removal was the same as that used in Example 13. A mixture of 304 parts of thiourea, 960 parts of 37% aqueous formaldehyde, and 800 parts of n-butyl alcohol was used to give a final yield of 1214 parts of a clear, light amber, syrupy product.

*Example 15*

The procedure of preparation including the removal of water was the same as that used in Example 13. A mixture of 120 parts of urea, 148 parts of thiourea, 950 parts of 37% aqueous formaldehyde, and 800 parts of n-butyl alcohol was used to give a final yield of 1175 parts of a clear, almost colorless, syrupy liquid.

*Example 16*

In a 3-liter 3-neck flask provided with a mechanical agitator, a thermometer, and a reflux condenser was placed 378 parts of melamine, 840 parts of 37% aqueous formaldehyde, and 725 parts of n-butyl alcohol. With continuous agitation the reaction mixture was heated to reflux temperature and the refluxing continued for a period of 30 minutes. At this point a water trap was placed in the distilling column between the flask and the reflux condenser and filled with toluene. The refluxing was continued until a total of 590 parts of water had been removed from the reaction mixture. The product amounting to 1342 parts was a clear, water-white, heavy syrupy liquid.

*Example 17*

In a 3-liter 3-neck flask provided with a mechanical agitator, a thermometer, and a reflux condenser was placed 1370 parts of p-toluenesulfonamide and 640 parts of 37% aqueous formaldehyde the pH of which had been previously adjusted to 6.0 with potassium acid phthalate and sodium hydroxide. With continuous agitation the reaction mixture was heated to reflux temperature over a period of 40 minutes and the refluxing continued for a period of 15 minutes. At this point the reaction mixture was allowed to cool and the water decanted from the resin. The resin was washed 3 times with warm water and finally dehydrated in vacuum at 30–50 mm. pressure, using a maximum flask temperature at 90° C. to yield 1245 parts of water-white resinous solid.

In Examples 1 through 9, inclusive, the Diphenolic Acid can be replaced by other biphenolic acids including acids containing chloro, bromo, nitro and alkyl groups of 1 to 5 carbon atoms such as 4,4-bis(4-hydroxy-3-ethyl phenyl) - pentanoic acid, 4,4 - bis(4-hydroxy - 2 - ethyl phenyl) - pentanoic acid, 4,4-bis(2 - hydroxy - 4 - butyl phenyl) - pentanoic acid, 4,4 - bis(4 - hydroxy - 3 - nitro phenyl) - pentanoic acid, 4,4 - bis(2 - hydroxy - 3 - nitro-phenyl) - pentanoic acid, 4,4 - bis(4 - hydroxy - 3 - methyl - phenyl) - pentanoic acid, 4,4 - bis(4 - hydroxy-3 - amyl phenyl) - pentanoic acid, 4,4 - bis(4 - hydroxy-3 - chloro phenyl) - pentanoic acid, 4 - (4 - hydroxyphenyl) - 4 - (4 - hydroxy - 3 - amyl phenyl) - pentanoic acid, 4-(4-hydroxyphenyl)-4-(2-hydroxy-4-chlorophenyl)-pentanoic acid, 4-(4-hydroxyphenyl)-4-(4-hydroxy-3,5-dibromo phenyl)-pentanoic acid, 4-(4-hydroxyphenyl)-4-(2-hydroxy-4-nitro phenyl)-pentanoic acid, 4-(4-hydroxy-phenyl) - 4 - (4 - hydroxy - 3 - sulfo phenyl) - pentanoic acid, 4 - (4 - hydroxyphenyl) - 4 - (2 - hydroxy - 3, 5-dimethyl phenyl) pentanoic acid, 5,5 - bis(4 hydroxy phenyl) hexanoic acid, 5,5-bis(4 hydroxy-3-methyl phenyl) hexanoic acid, 5,5-bis(4-hydroxyl-3-nitro phenyl) hexanoic acid, and 5,5-bis(4 hydroxyl-3-chloro phenyl) hexanoic acid.

In Examples 1 to 17 inclusive, the aldehyde can be replaced by other aldehydes including acetaldehyde, propionaldehyde, n - butyraldehyde, isobutyraldehyde, valeraldehyde, capronaldehyde, heptaldehyde as well as the more complex aldehydes such as furfural.

In Examples 10 to 12 inclusive, the phenol modifier can be replaced by other phenols including ortho, meta, and para cresol, 2,4 xylenol, 3,4 xylenol, 2,5 xylenol, 3,5 xylenol, p-phenyl phenol, p-cyclohexylphenol, and p-tert-amylphenol.

In Examples 13 to 17 inclusive, the ammonia derivative can be replaced by other materials which have a >NH group with the free valences being filled by hydrogen or carbon atoms. This therefore includes amides and primary and secondary amines such as the ureas, thioureas, melamines, sulfonamides, and alkyl-substituted derivatives thereof. It is only necessary that the material be capable of condensing with an aldehyde.

OPERABLE EPOXIDES

Illustrative of the epoxide compositions which may be employed in this invention are the complex epoxide resins which are polyether derivatives of polyhydric phenols with such polyfunctional coupling agents as polyhalohydrins, polyepoxides, or epihalohydrins. These compositions may be described as polymeric polyhydric alcohols having alternating aliphatic chains and nuclei connected to each other by ether linkages, containing terminal epoxide groups and free from functional groups other than epoxide and hydroxyl groups. It should be understood that significant amounts of the monomeric reaction products are often present. This would be illustrated by III to V below where $n$ equals zero. Preparation of these epoxide materials as well as illustrative examples are described in U.S. patents, 2,456,408, 2,503,726, 2,615,007, 2,615,008, 2,668,807, 2,688,805, and 2,698,315. Well-known commercial examples of these resins are the Epon resins marketed by the Shell Chemical Corporation. Illustrative of the preparation of these epoxide resins are the following reactions wherein the difunctional coupling agent is used in varying molar excessive amounts:

Polyhydric phenol and an epihalohydrin bis(hydroxyphenyl)isopropylidene + excess epichlorohydrin

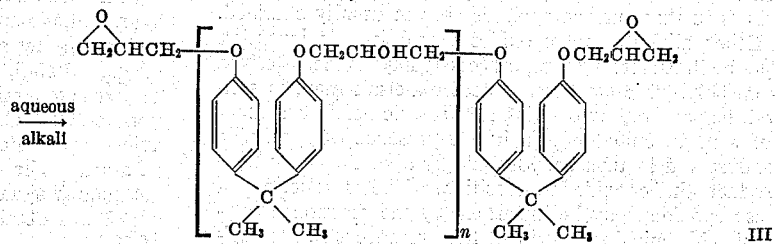

Polyhydric phenol and a polyepoxide bis(hydroxyphenyl)isopropylidene + excess butylene dioxide

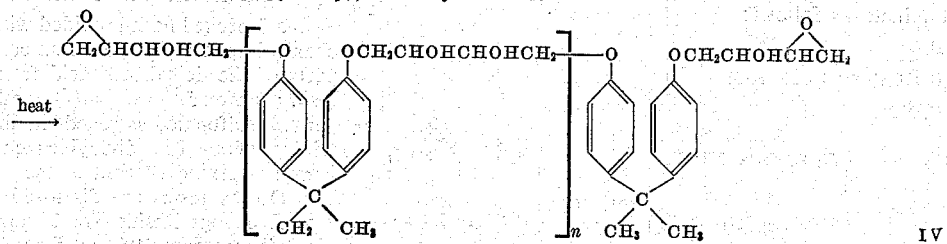

Polyhydric phenol and a polyhalohydrin bis(hydroxyphenyl)isopropylidene + excess α-glycerol dichlorohydrin

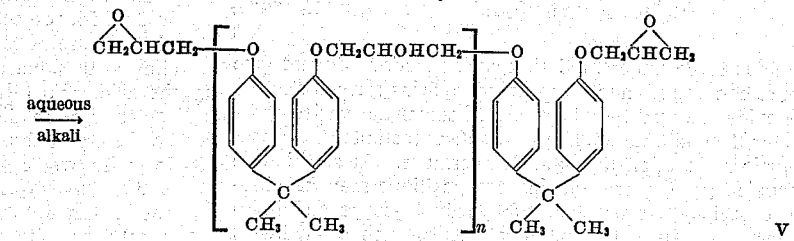

As used in the above formulas, $n$ indicates the degree of polymerization depending on the molar ratio of reactants. As can be seen from these formulas, the complex epoxide resins used in this invention contain terminal epoxide groups and alcoholic hydroxyl groups attached to the aliphatic portions of the resin, the latter being formed by the splitting of epoxide groups in the reaction of the same with phenolic hydroxyl groups. Ultimately, the reaction with the phenolic hydroxyl groups of the polyhydric phenols is generally accomplished by means of epoxide groups formed from halohydrins by the loss of hydrogen and halogen as shown by the following equation:

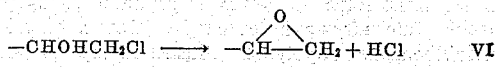

Other epoxide compositions which may be used include the polyepoxide polyesters which may be prepared by esterifying tetrahydrophthalic anhydride with a glycol and epoxidizing the product of the esterification reaction. In the preparation of the polyesters, tetrahydrophthalic acid may also be used as well as the simple esters of tetrahydrophthalic acid such as dimethyl and diethyl esters. There is a tendency with tertiary glycols for dehydration to occur under the conditions used for esterification so that generally the primary and secondary glycols are the most satisfactory in the polyester formation. Glycols which may be used in the preparation of this polyester composition comprise, in general, those glycols having 2 hydroxyl groups attached to separate carbon atoms and free from functional groups which would interfere with the esterification or epoxidation reactions. These glycols include such glycols as ethylene glycol, diethylene glycol, triethylene glycol, tetramethylene glycol, propylene glycol, polyethylene glycol, neopentyl glycol, and hexamethylene glycol. Polyepoxide polyesters may be prepared from these polyesters by epoxidizing the unsaturated portions of the tetrahydrophthalic acid residues in the polyester composition. By properly proportioning reactants in the polyester formation and regulating the epoxidation reaction, polyepoxides having up to 12 or more epoxide groups per molecule may be readily prepared. These polyepoxide polyester compositions as well as their preparation are more fully described in a copending application having Serial No. 503,323, filed April 22, 1955.

Polyepoxide compositions useful in this invention also include the epoxidized unsaturated natural oil acid esters, including the unsaturated vegetable, animal, and fish oil acid esters made by reacting these materials with various oxidizing agents. These unsaturated oil acid esters are long chain aliphatic acid esters containing from about 15 to 22 carbon atoms. These acids may be esterified by simple monohydric alcohols such as methyl, ethyl, or decyl alcohol, by polyhydric alcohols such as glycerol, pentaerythritol, polyallyl alcohol, or resinous polyhydric alcohols. Also suitable are the mixed esters of polycarboxylic acids and long chain unsaturated natural oil acids with polyhydric alcohols, such as glycerol and pentaerythritol. These epoxidized oil acid esters may contain more than 1 up to 20 epoxide groups per molecule. The method of epoxidizing these unsaturated oil acid esters consists of treating them with various oxidizing agents, such as the organic peroxides and the peroxy acids, or with one of the various forms of hydrogen peroxide. A typical procedure practiced in the art consists of using hydrogen peroxide in the presence of an organic acid, such as acetic acid and a catalytic material, such as sulfuric acid. More recently epoxidation methods have consisted of replacing the mineral acid catalyst with a sulfonated cation exchange material, such as the sulfonated copolymer of styrene divinylbenzene.

The epoxide compositions which may be used in preparing the compositions of this invention also include aliphatic polyepoxides which may be illustrated by the products obtained by polymerizing allyl glycidyl ether through its unsaturated portion. In the polymerization of these ethers there is probably some polymerization occurring through the epoxide groups, and in addition some splitting of the epoxide groups to form hydroxyl groups so that pure compounds are not usually obtained.

Other aliphatic polyepoxides useful in this invention may be illustrated by the poly(epoxyalkyl) ethers derived from polyhydric alcohols. These materials may, in general, be prepared by reacting an aliphatic polyhydric alcohol with an epihalohydrin in the presence of a suitable catalyst and in turn dehydrohalogenating the product to produce the epoxide composition. The production of these epoxides may be illustrated by the reaction of glycerol with epichlorohydrin in the presence of boron trifluoride followed by dehydrohalogenation with sodium aluminate as follows:

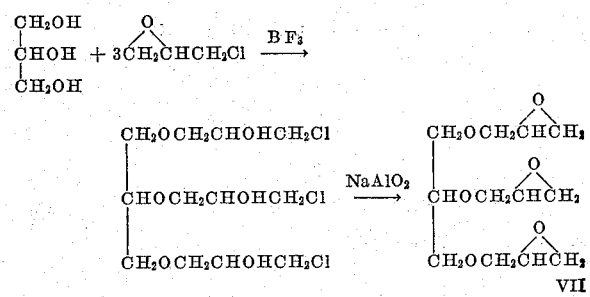

It is to be understood that such reactions do not give pure compounds and that the halohydrins formed and the epoxides derived therefrom are of somewhat varied character depending upon the particular reactants, their proportions, reaction time and temperature. In addition to epoxide groups, the epoxide compositions may be characterized by the presence of hydroxyl groups and halogens. Dehydrohalogenation affects only those hydroxyl groups and halogens which are attached to adjacent carbon atoms. Some halogens may not be removed in this step in the event that the proximate carbinol group has been destroyed by reaction with an epoxide group. These halogens are relatively unreactive and are not to be considered as functional groups in the conversion of the reaction mixture of this invention. The preparation of a large number of these mixed polyepoxides is described in the Zech patents, U.S. 2,538,072, 2,581,464, and 2,712,000. Still other polyepoxides which have been found to be valuable are such epoxide compositions as diepoxy butane, diglycid ether, and epoxidized polybutadiene.

Immediately following will be a description or illustration of preparations of polyepoxides which will be used in examples of compositions of this invention.

The complex resinous polyepoxides used in the examples and illustrative of the commercially prepared products of this type are the Epon resins marketed by Shell Chemical Corporation. The following table gives the properties of some Epon resins which are prepared by the condensation in the presence of alkali of bis(4-hydroxyphenyl) isopropylidene with a molar excess of epichlorohydrin in varying amounts.

| Epon resin type | Melting point, °C. | Viscosity [1] (Gardner-Holdt) | Epoxide equivalent | Average molecular weight |
| --- | --- | --- | --- | --- |
| Epon 864 | 40– 45 | $A_1$–B | 325 | 450 |
| Epon 1001 | 64– 76 | C–G | 480 | 640 |
| Epon 1004 | 95–105 | Q–U | 870 | 1,133 |
| Epon 1007 | 127–133 | Y–$Z_1$ | 1,750 | |
| Epon 1009 | 145–155 | $Z_2$–$Z_3$ | 3,200 | |

[1] Based on 40% nonvolatile in butyl Carbitol at 25° C.

Examples 18 through 20 describe the preparation of typical polyepoxide polyesters.

Example 18

PREPARATION OF POLYESTER FROM TETRAHYDROPHTHALIC ANHYDRIDE AND ETHYLENE GLYCOL

In a 3-necked flask provided with a thermometer, mechanical agitator, and a reflux condenser attached through a water trap was placed a mixture of 3 mole of tetrahydrophthalic anhydride and 2 mole of n-butanol. After melting the tetrahydrophthalic anhydride in the presence of the butanol, 2 mols of ethylene glycol were added. The reaction mixture was gradually heated with agitation to 225° C. at which point a sufficient amount of xylene was added to give refluxing at esterification temperature. The reaction mixture was then heated with continuous agitation at 225–235° C. until an acid value of 4.2 was obtained. This product gave an iodine value of 128.

EPOXIDATION OF THE POLYESTER RESIN

In a 3-necked flask provided with a thermometer, a mechanical agitator, and a reflux condenser was placed 107 parts of the dehydrated acid form of a cation exchange resin (Dowex 50X-8, 50–100 mesh, Dow Chemical Company, a sulfonated styrenedivinylbenzene copolymer containing about 8% divinylbenzene, the percent divinylbenzene serving to control the amount of crosslinkage. The Dowex resins are discussed in publications entitled "Ion Exchange Resins No. 1" and "Ion Exchange Resins No. 2," copyright 1954 by Dow Chemical Company, the publications having form number Sp32–254, and Sp 31–354, respectively), and 30 parts glacial acetic acid. The mixture of cation exchange resin and acetic acid was allowed to stand until the resin had completely taken up the acid. To this mixture was added 200 parts of the polyester resin dissolved in an equal weight of xylene. To the continuously agitated reaction mixture was added dropwise over a period of 45 minutes to 1 hour, 75 parts of 50% hydrogen peroxide. The reaction temperature was held at 60° C. requiring the application of some external heat. (In some preparations involving other polyester resins, sufficient exothermic heat is produced during the addition of hydrogen peroxide so that no external heat is required, or even some external cooling may be required.) The reaction was continued at 60° C. until a milliliter sample of the reaction mixture analyzed less than 1 milliliter of 0.1 N sodium thiosulfate in an iodometric determination of hydrogen peroxide. The product was then filtered, finally pressing the cation exchange resin filter cake. The acid value of the total resin solution was 42. The percent non-volatile of this solution amounting to 400 parts was 50. This 400 parts of solution was thoroughly mixed with 110 parts of the dehydrated basic form of Dowex 1 (an anion exchange resin of the quaternary ammonium type. Dowex 1 is a styrenedivinylbenzene copolymer illustrated by the formula RR′$_3$N+CH− where R represents the styrene-divinylbenzene matrix and R′ is a methyl group, manufactured by the Dow Chemical Company). The resulting mixture was then filtered followed by pressing as much of the solution as possible from the anion exchange resin cake. This product had an acid value of 4.5 and an epoxide equivalent of 288 based on a non-volatile resin content of 42.0%. The epoxide values as discussed herein were determined by refluxing for 30 minutes a 2-gram sample with 50 milliliters of pyridine hydrochloride in excess pyridine. (The pyridine hydrochloride solution was prepared by adding 20 milliliters of concentrated HCl to a liter of pyridine.) After cooling to room temperature, the sample is then back-titrated with standard alcoholic sodium hydroxide.

Example 19

Following the procedure of Example 18, a polyester resin was prepared from 5 mols of tetrahydrophthalic anhydride, 4 mols of diethylene glycol, and 2 mols of n- butanol. This product had an acid value of 5.3 and an iodine value of 107. This polyester resin was epoxidized in the manner previously described to give an epoxide equivalent weight of 371 on the nonvolatile content. The nonvolatile content of this resin solution as prepared was 40.2%.

*Example 20*

The process of Example 18 was followed to obtain a polyester resin from 1.1 mols of tetrahydrophthalic anhydride, 1 mol of 1,4-butanediol and 0.2 mol of n-butanol. The product had an acid value of 8.6. This polyester resin was epoxidized in the same manner to give an epoxide equivalent weight of 292 and an acid value of 5.2 on the nonvolatile content. The nonvolatile content of this resin solution was 41.9%.

Examples 21 and 22 describe the preparation of epoxidized vegetable oil acid esters.

*Example 21*
EPOXIDIZED SOYBEAN OIL ACID MODIFIED ALKYD RESIN

*a. Preparation of alkyl resin.*—To a kettle provided with a condenser was added 290 parts of white refined soyabean oil. While bubbling a continuous stream of nitrogen through this oil the temperature was raised to 250° C., at which temperature 0.23 part of litharge were added and the temperature held at 250° C. for 5 minutes. While holding the temperature above 218° C., 68 parts of technical pentaerythritol were added after which the temperature was raised to 238° C. and held until a mixture of 1 part of the product and 2½ parts of methyl alcohol showed no insolubility (about 15 minutes). At this point 136 parts of phthalic anhydride were added and the temperature gradually raised to 250° C. and held at this temperature for 30 minutes. At this point the condenser was removed from the kettle and the pressure reduced somewhat by attaching to a water aspirator evacuating system. With continuous agitation the mixture was held at 250° C. until the acid value had reached 10.5. At this point the resin was thinned with xylene to 48% nonvolatile content having a viscosity of H (Gardner bubble viscosimeter).

*b. Epoxidation of a soyabean oil acid modified alkyl resin.*—In a 3-necked flask provided with a thermometer, a mechanical agitator and a reflux condenser was placed 70 parts of dehydrated acid form of a cation exchange resin (Dowex 50X-8) and 15 parts glacial acetic acid. The mixture of cation exchange resin and acetic acid was allowed to stand until the resin had completely taken up the acid. To this mixture was added 315 parts of the alkyd resin solution described in the above paragraph and 190 parts of xylene. To the continuously agitated reaction mixture was added dropwise 38 parts of 50% hydrogen peroxide. The reaction temperature was held at 60° C. until a milliliter sample of the reaction mixture analyzed less than one milliliter of 0.1 N sodium thiosulfate in an iodometric determination of hydrogen peroxide. The product was then filtered, finally pressing the cation exchange resin filter cake. The epoxide equivalent on the nonvolatile content was 475.

In order to remove the free acidity from the epoxidized product, 400 parts of the solution were thoroughly mixed with 110 parts of the dehydrated basic form of Dowex 1 (an amine type anion exchange resin). The resulting mixture was then filtered, followed by pressing as much of the solution as possible from the anion exchange resin cake.

*Example 22*

Admex 710, an epoxidized soyabean oil having an equivalent weight to an epoxide of 263, was dissolved in methyl ethyl ketone to a non-volatile content of 50%. Admex 710, a product of the Archer-Daniels-Midland Company, has an acid value of 1, a viscosity of 3.3 stokes at 25° C. and an average molecular weight of 937.

Examples 23 and 24 describe the preparation of aliphatic polyepoxides.

*Example 23*

In a reaction vessel provided with a mechanical stirrer and external cooling means was placed 276 parts of glycerol and 828 parts of epichlorohydrin. To this reaction mixture was added 1 part of 45% boron trifluoride ether solution diluted with 9 parts of ether. The reaction mixture was agitated continuously. The temperature rose to 50° C. over a period of 1 hour and 45 minutes at which time external cooling with ice water was applied. The temperature was held between 50 and 75° C. for 1 hour and 20 minutes. To 370 parts of this product in a reaction vessel provided with a mechanical agitator and a reflux condenser was added 900 parts of dioxane and 300 parts of powdered sodium aluminate. With continuous agitation this reaction mixture was gradually heated to 92° C. over a period of 1 hour and 50 minutes, and held at this temperature for 8 hours and 50 minutes. After cooling the room temperature, the inorganic material was removed by filtration. The dioxane and low boiling products were removed by heating the filtrate to 205° C. at 20 mm. pressure to give a pale yellow product. The epoxide equivalent of this product was determined by treating a 1-gram sample with an excess of pyridine containing pyridine hydrochloride (made by adding 20 cc. of concentrated hydrochloric acid per liter of pyridine) at the boiling point for 20 minutes and back-titrating the excess pyridine hydrochloride with 0.1 N sodium hydroxide using phenolphthalein as indicator and considering one HCl as equivalent to one epoxide group. The epoxide equivalent on this product was found to be 152.

*Example 24*

In a 3-necked flask provided with a thermometer, a mechanical agitator, a reflux condenser and a dropping funnel was placed 402 parts of allyl glycidyl ether. With continuous agitation the temperature was raised to 160° C. at which time one part of a solution of methyl ethyl ketone peroxide, dissolved in diethyl phthalate to a 60% content, was added. The temperature was held at 160–165° C. for a period of 8 hours, adding one part of the methyl ethyl ketone peroxide solution each 5 minutes during this 8-hour period. After the reaction mixture had stood overnight, the volatile ingredients were removed by vacuum distillation. The distillation was started at 19 mm. pressure and a pot temperature of 26° C. and volatile material finally removed at a pressure of 3 mm. and a pot temperature of 50° C. The residual product had a molecular weight of 418, and equivalent weight to epoxide content of 198, the yield amounting to 250 parts.

GENERAL REACTION CONDITIONS AND CHARACTERISTICS OF THE NEW COMPOSITIONS

In making the new compositions, the polyepoxides and aldehyde condensates are admixed in suitable proportions and reaction will proceed merely by the application of heat. More specifically the reaction is effected by heating the mixtures at elevated temperatures, usually in the range of about 75–250° C. Catalysts are unnecessary, but in certain cases it may be desirable to speed up the reaction by the use of catalysts, such as boron trifluoride adducts, sodium phenoxides, and mineral acid type catalysts.

The reaction mixtures and final reaction products of this invention can be prepared by using varying ratios of epoxide to aldehyde condensate. The quantities of reactants employed in a given instance will depend upon the characteristics desired in the final product. Flexible conversion products can be obtained from a hard epoxide by employing relatively large amounts of a low-melting aldehyde condensates or flexibility may be imparted by larger amounts of a soft epoxide. In general, operable products are those in which the ratio of epoxide to aldehyde condensate ranges from about 6:1 to 1:6 with the preferred range, because of the general overall characteristics, being from 2:1 to 1:2.

Compositions containing the polyepoxides and the aldehyde condensates may be used as mixtures or at varying intermediate stages of reaction. The initial mixtures or intermediate reaction products which are soluble in common organic solvents may be blended in solution in proper proportions and the solutions then applied as an impregnant for fabrics or paper, or for the formation of protective coating films. Subsequent heating functions to remove the solvent and bring about polymerization to the insoluble, infusible state. For other uses, the initial or intermediate mixture may be used without a solvent, giving directly a composition which, on the application of heat, converts to an infusible, insoluble final product.

For the preparation of semi-liquid adhesive compositions, low-melting or syrupy polyepoxides would be used with a low-melting aldehyde condensate. For various other applications, higher melting compositions are desirable in which case partially polymerized mixtures of the polyepoxide and aldehyde condensate could advantageously be used. An alternative method of obtaining the higher melting compositions is to choose higher melting forms of the polyepoxide and aldehyde condensate.

In making the new compositions and products herein described, the polyepoxides and the aldehyde condensates may be used in regulated proportions without the addition of other materials. For certain uses, other components are often advantageously added, including filling and compounding materials, plasticizers, pigments, etc. Compositions which tend to give somewhat brittle products on conversion to the insoluble, infusible state are advantageously compounded with plasticizers. For most applications, it is possible to obtain suitable flexibility and toughness by regulating the proportions and types of reacting ingredients, thereby obviating the need for plasticizers.

The application of heat to the mixtures herein set forth may involve several chemical reactions. It will be appreciated that the reactions involved are very complex and the extent to which each takes place will vary with the temperature used in heat treating, the period of time therefor, and with the particular types of polyepoxides, and aldehyde condensates, chosen. While it is not desired to be limited by any theoretical explanation of the exact nature of these reactions, it seems probable that conversion to the final polymeric products is accompanied by direct polymerization of the epoxide groups inter se; reaction of the epoxide groups with methylol hydroxyl groups; reaction of the epoxide groups with phenolic hydroxyl or carboxyl groups, and reaction of epoxide groups with active hydrogen attached to a nitrogen atom, all of which take place to some extent simultaneously in forming the final products.

The present invention provides a wide range of reaction compositions and products including initial mixtures of the polyepoxides and the aldehyde condensates, partial or intermediate reaction products of such mixtures and compositions containing such intermediate reaction products as well as final reaction products. In general, the initial mixtures, as well as the intermediate reaction products unless too highly polymerized, are soluble in solvents of the lacquer type, such as ketone or ester solvents.

In addition to having outstanding physical properties, such as hardness, toughness, and flexibility, the final infusible, insoluble products have outstanding chemical properties, such as high resistance to oxidation, water, alkali, acids and organic solvents. It has also been observed that the final conversion products possess unusually good adhesion to most surfaces including metal, glass, wood, and plastics. This property of outstanding adhesion to a wide variety of surfaces gives the subject products high potential value for use in formulating adhesives. This property is also of extreme value in formulating protective coating films for use on many types of surfaces. The adhesion characteristics are probably due to the fact that even in the converted, infusible state, the compositions contain a relatively high percentage of highly polar groups, such as ether groups, ester groups, and alcoholic and phenolic hydroxyl groups. Despite the high percentage of polar groups in the insoluble, infusible products of this invention the tolerance for water is usually low, apparently due to the high molecular weight and rigid cross-linked structure of the final compositions.

Examples 25 to 173, inclusive, illustrate the preparation of insoluble, infusible protective coating films from the compositions of this invention. In the preparation of the composition for heat curing to form the protective coating films, each of the aldehyde condensates and the polyepoxides with the exception of epoxidized polyesters were dissolved in methyl ethyl ketone to a nonvolatile content of 40–60%. The epoxidized polyesters were used at the nonvolatile and in the solvent in which they were prepared. Some of the aldehyde condensates required a mixture of methyl ethyl ketone and butanol to effect complete solubility. Mixtures of the polyepoxides and aldehyde condensates were found to be stable for extended periods of time at normal temperatures. Mixtures of the solutions were spread on panels with a .002" Bird applicator and the films were baked for periods of 30 to 90 minutes at temperatures ranging from 150–200° C. Proportions as used in the following table refer to parts by weight and are based on the nonvolatile content of the solutions of reactants.

| Example No. | Polyepoxide | Parts | Aldehyde condensate | Parts | Catalyst Type | Catalyst Parts | Conversion Time (hrs.) | Conversion Temp. (° C.) | Film resistance $H_2O$ at (100° C.) | Film resistance Hours 5% aqueous NaOH (at 25° C.) |
|---|---|---|---|---|---|---|---|---|---|---|
| 25 | Epon 864 | 5 | Ex. 2 | 6.1 | | | 0.5 | 175 | 5 min | 1 hr. 30 min. |
| 26 | Epon 1001 | 5 | Ex. 9 | 3.5 | | | 0.5 | 175 | 15 min | 204 hr. |
| 27 | Epon 1004 | 5 | Ex. 9 | 1.9 | | | 0.5 | 175 | 5 min | 6 hr. 15 min. |
| 28 | Epon 1007 | 5 | Ex. 2 | 1.2 | | | 0.5 | 175 | 5 min | 8 hr. 15 min. |
| 29 | do | 5 | Ex. 5 | 1.2 | | | 0.5 | 175 | 5 min | 180 hr. |
| 30 | do | 5 | Ex. 1 | 2.0 | | | 0.5 | 175 | 5 min | 6 hr. 15 min. |
| 31 | Epon 1001 | 5 | Ex. 2 / Ex. 10 | 4.4 / 0.9 | | | 0.5 | 175 | 7 hr. 30 min | 1 hr. 15 min. |
| 32 | do | 5 | Ex. 2 / Ex. 10 | 4.4 / 1.0 | | | 0.5 | 175 | 30 min | 9 hr. |
| 33 | Epon 1004 | 5 | Ex. 2 / Ex. 10 | 2.3 / 2.8 | | | 0.25 | 200 | 45 min | 9 hr. |
| 34 | do | 5 | Ex. 2 / Ex. 10 | 2.3 / 4.2 | | | 0.5 | 175 | 1 hr. 45 min | 8 hr. 30 min. |
| 35 | do | 5 | Ex. 2 / Ex. 10 | 2.3 / 4.2 | | | 0.25 | 200 | 1 hr. 45 min | 9 hr. 45 min. |
| 36 | do | 5 | Ex. 5 / Ex. 10 | 2.5 / .7 | | | 0.5 | 175 | 15 min | 3 hr. 15 min. |
| 37 | do | 5 | Ex. 9 / Ex. 10 | 1.9 / 1.8 | | | 0.5 | 175 | 1 hr. 45 min | 10 hr. 15 min. |

| Example No. | Polyepoxide | Parts | Aldehyde condensate | Parts | Catalyst Type | Parts | Conversion Time (hrs.) | Temp. (°C.) | Film resistance H₂O at (100° C.) | Hours 5% aqueous NaOH (at 25° C.) |
|---|---|---|---|---|---|---|---|---|---|---|
| 38 | Epon 1007 | 5 | Ex. 2 / Ex. 10 | 1.2 / .6 | | | 0.5 | 175 | 15 min | 1 hr. 15 min. |
| 39 | do | 5 | Ex. 3 / Ex. 10 | .9 / .6 | | | 0.5 | 175 | 15 min | 1 hr. 15 min. |
| 40 | do | 5 | Ex. 4 / Ex. 10 | 1.1 / .6 | | | 0.5 | 175 | 10 min | 4 hr. 45 min. |
| 41 | do | 5 | Ex. 1 / Ex. 10 | 2.0 / .7 | | | 0.5 | 175 | 15 min | 5 hr. 15 min. |
| 42 | do | 5 | Ex. 1 / Ex. 10 | 2.0 / 1.4 | | | 0.5 | 175 | 15 min | 5 hr. 45 min. |
| 43 | do | 5 | Ex. 1 / Ex. 10 | 2.0 / 2.1 | | | 0.5 | 175 | 45 min | 5 hr. 15 min. |
| 44 | Epon 864 | 5 | Ex. 2 / Ex. 12 | 6.1 / 1.1 | | | 0.5 | 175 | 8 hr. 45 min | 5 hr. 15 min. |
| 45 | Epon 1001 | 5 | Ex. 1 / Ex. 12 | 7.3 / 1.2 | | | 0.5 | 175 | 3 hr. 15 min | 45 min. |
| 46 | do | 5 | Ex. 9 / Ex. 12 | 3.5 / .8 | | | 0.5 | 175 | 15 min | 3 hr. 45 min. |
| 47 | Epon 1004 | 5 | Ex. 1 / Ex. 12 | 4.0 / .9 | | | 0.5 | 175 | 3 hr. 15 min | 1 hr. 15 min. |
| 48 | Epon 1007 | 5 | Ex. 5 / Ex. 12 | 1.2 / .6 | | | 0.5 | 175 | 15 min | 10 hr. 45 min. |
| 49 | do | 5 | Ex. 4 / Ex. 11 | 1.1 / .6 | | | 0.5 | 175 | 10 min | 1 hr. 15 min. |
| 50 | Ex. 18 | 5 | Ex. 2 | 8.1 | | | 0.5 | 175 | 10 hr. 45 min | 10 min. |
| 51 | Ex. 19 | 5 | Ex. 2 | 4.5 | | | 0.5 | 175 | 9 hr. 45 min | 10 min. |
| 52 | Ex. 18 | 5 | Ex. 2 / Ex. 10 | 8.1 / 1.3 | | | 0.5 | 175 | 1 hr. 45 min | 10 min. |
| 53 | Ex. 19 | 5 | Ex. 2 / Ex. 10 | 4.5 / 2.7 | | | 0.5 | 175 | 1 hr | 2 hr. 45 min. |
| 54 | Ex. 19 | 5 | Ex. 5 / Ex. 10 | 4.8 / 2.7 | | | 0.5 | 175 | 1 hr | 15 min. |
| 55 | Ex. 19 | 5 | Ex. 9 / Ex. 10 | 3.7 / 1.6 | | | 0.5 | 175 | 45 min | 7 hr. 45 min. |
| 56 | Ex. 19 | 5 | Ex. 2 / Ex. 12 | 4.5 / 1.8 | | | 0.5 | 175 | 4 hr. 45 min | 2 hr. 45 min. |
| 57 | Ex. 19 | 5 | Ex. 5 / Ex. 12 | 4.8 / 1.8 | | | 0.5 | 175 | 1 hr. 45 min | 2 hr. 45 min. |
| 58 | Ex. 21 | 5 | Ex. 2 | 2.5 | | | 0.5 | 175 | 3 hr. 45 min | 30 min. |
| 59 | Ex. 21 | 5 | Ex. 3 | 2.1 | | | 0.5 | 175 | 1 hr. 15 min | 30 min. |
| 60 | Ex. 21 | 5 | Ex. 4 | 2.3 | | | 0.5 | 175 | 1 hr. 15 min | 30 min. |
| 61 | Ex. 21 | 5 | Ex. 5 | 2.7 | | | 0.5 | 175 | 1 hr. 15 min | 30 min. |
| 62 | Ex. 21 | 5 | Ex. 1 | 4.3 | | | 0.5 | 175 | 45 min | 30 min. |
| 63 | Ex. 21 | 5 | Ex. 9 | 2.0 | | | 0.5 | 175 | 1 hr. 15 min | 1 hr. 15 min. |
| 64 | Ex. 22 | 5 | Ex. 2 | 7.8 | | | 0.5 | 175 | 4 hr. 45 min | 30 min. |
| 65 | Ex. 22 | 5 | Ex. 1 | 13.5 | | | 0.5 | 175 | 3 hr. 45 min | 10 min. |
| 66 | Ex. 22 | 5 | Ex. 9 | 6.4 | | | 0.5 | 175 | 4 hr. 45 min | 15 min. |
| 67 | Ex. 23 | 5 | Ex. 2 | 13.7 | | | 0.5 | 175 | 9 hr. 30 min | 30 min. |
| 68 | Ex. 23 | 5 | Ex. 2 | 6.9 | | | 0.5 | 175 | 1 hr. 30 min | 2 hr. |
| 69 | Ex. 23 | 5 | Ex. 3 | 5.7 | | | 0.5 | 175 | 1 hr. 30 min | 15 min. |
| 70 | Ex. 23 | 5 | Ex. 3 / Ex. 12 | 5.7 / 1.1 | | | 0.5 | 175 | 1 hr. 30 min | 1 hr. |
| 71 | Ex. 23 | 5 | Ex. 4 | 12.5 | | | 0.5 | 175 | 1 hr. 30 min | 30 min. |
| 72 | Ex. 23 | 5 | Ex. 4 | 6.3 | | | 0.5 | 175 | 1 hr. 30 min | 2 hr. |
| 73 | Ex. 23 | 5 | Ex. 5 | 14.6 | | | 0.5 | 175 | 6 hr. 30 min | 30 min. |
| 74 | Ex. 23 | 5 | Ex. 5 | 7.3 | | | 0.5 | 175 | 1 hr. 30 min | 15 min. |
| 75 | Ex. 23 | 5 | Ex. 5 / Ex. 11 | 7.3 / 2.4 | | | 0.5 | 175 | 1 hr. 30 min | 30 min. |
| 76 | Ex. 23 | 5 | Ex. 1 | 11.2 | | | 0.5 | 175 | 5 hr. 30 min | 30 min. |
| 77 | Ex. 23 | 5 | Ex. 1 / Ex. 12 | 11.2 / 3.2 | | | 0.5 | 175 | 2 hr. 30 min | 10 min. |
| 78 | Ex. 23 | 5 | Ex. 1 | 5.6 | | | 0.5 | 175 | 1 hr. 30 min | 45 min. |
| 79 | Ex. 23 | 5 | Ex. 9 | 23.5 | | | 0.5 | 175 | 9 hr. 30 min | 30 min. |
| 80 | Ex. 23 | 5 | Ex. 9 / Ex. 10 | 23.5 / 2.8 | | | 0.5 | 175 | 2 hr. 30 min | 10 min. |
| 81 | Ex. 23 | 5 | Ex. 9 | 11.8 | | | 0.5 | 175 | 6 hr | 1 hr. 15 min. |
| 82 | Ex. 24 | 1 | Ex. 5 | 4.4 | | | 0.5 | 175 | 11 hr. 30 min | 10 min. |
| 83 | Ex. 24 | 1 | Ex. 5 | 2.2 | | | 0.5 | 175 | 3 hr. 30 min | 15 min. |
| 84 | Epon 864 | 5 | Ex. 3 / Ex. 13 | 5.1 / 1.0 | | | 0.5 | 175 | 1 hr. 30 min | 30 hr. |
| 85 | do | 5 | Ex. 4 / Ex. 13 | 5.6 / 1.1 | | | 0.5 | 150 | 30 min | 6 hr. |
| 86 | do | 5 | Ex. 1 / Ex. 13 | 10.5 / 4.5 | | | 0.5 | 150 | 3 hr. 30 min | 1 hr. 30 min. |
| 87 | Epon 1001 | 5 | Ex. 3 / Ex. 13 | 3.5 / 0.8 | | | 0.5 | 150 | 1 hr | 10 hr. |
| 88 | do | 5 | Ex. 9 / Ex. 13 | 3.5 / 0.8 | | | 0.5 | 150 | 1 hr | 58 hr. |
| 89 | Epon 1004 | 5 | Ex. 4 / Ex. 13 | 2.1 / 1.4 | | | 0.5 | 150 | 15 min | 28 hr. |
| 90 | do | 5 | Ex. 9 / Ex. 13 | 1.9 / 0.7 | | | 0.5 | 150 | 1 hr | 58 hr. |
| 91 | Epon 1007 | 5 | Ex. 2 / Ex. 13 | 1.2 / 0.6 | | | 0.5 | 150 | 2 hr. 30 min | 15 hr. |
| 92 | do | 5 | Ex. 1 / Ex. 13 | 2.0 / 0.7 | | | 0.5 | 150 | 1 hr | 10 hrs. 30 min. |
| 93 | Epon 1001 | 5 | Ex. 5 / Ex. 13 | 4.5 / 0.9 | | | 0.5 | 175 | 1 hr | 7 hr. |
| 94 | Epon 864 | 5 | Ex. 9 / Ex. 14 | 5.0 / 1.0 | | | 0.5 | 150 | 1 hr | 1 hr. 30 min. |
| 95 | Epon 1001 | 5 | Ex. 2 / Ex. 14 | 4.4 / 0.9 | | | 0.5 | 150 | 6 hr | 1 hr. |
| 96 | Epon 1004 | 5 | Ex. 4 / Ex. 14 | 2.1 / 0.7 | | | 0.5 | 150 | 45 min | 2 hr. 30 min. |
| 97 | Epon 1007 | 5 | Ex. 2 / Ex. 14 | 1.2 / 0.6 | | | 0.5 | 150 | 45 min | 1 hr. |
| 98 | do | 5 | Ex. 5 / Ex. 14 | 1.2 / 0.6 | | | 0.5 | 150 | 45 min | 27 hr. 30 min. |
| 99 | Epon 1004 | 5 | Ex. 3 / Ex. 14 | 1.2 / 0.7 | | | 0.5 | 150 | 45 min | 1 hr. |
| 100 | Epon 1007 | 5 | Ex. 1 / Ex. 14 | 2.0 / 0.7 | | | 0.5 | 150 | 1 hr. 30 min | 1 hr. |

| Example No. | Polyepoxide | Parts | Aldehyde condensate | Parts | Catalyst Type | Catalyst Parts | Conversion Time (hrs.) | Conversion Temp. (°C.) | Film resistance H₂O at (100° C.) | Film resistance Hours 5% aqueous NaOH (at 25° C.) |
|---|---|---|---|---|---|---|---|---|---|---|
| 101 | Epon 1001 | 5 | Ex. 1 / Ex. 15 | 7.3 / 1.2 | | | 0.5 | 150 | 1 hr | 7 hr. |
| 102 | Epon 864 | 5 | Ex. 9 / Ex. 15 | 5.0 / 2.0 | | | 0.5 | 150 | 3 hr. 30 min | 16 hr. |
| 103 | Epon 1004 | 5 | Ex. 3 / Ex. 15 | 1.9 / 0.7 | | | 0.5 | 150 | 30 min | 6 hr. 30 min. |
| 104 | do | 5 | Ex. 5 / Ex. 15 | 2.5 / 0.7 | | | 0.5 | 150 | 5 hr | 7 hr. |
| 105 | Epon 1007 | 5 | Ex. 2 / Ex. 15 | 1.2 / 0.6 | | | 0.5 | 150 | 2 hr | 7 hr. |
| 106 | do | 5 | Ex. 4 / Ex. 15 | 1.1 / 0.6 | | | 0.5 | 150 | 30 min | 7 hr. |
| 107 | Epon 864 | 5 | Ex. 2 / Ex. 16 | 6.0 / 1.1 | | | 0.5 | 150 | 1 hr. 30 min | 25 hr. 30 min. |
| 108 | do | 5 | Ex. 2 / Ex. 17 | 6.1 / 1.1 | | | 0.5 | 150 | 5 hr. 30 min | 2 hr. 30 min. |
| 109 | do | 5 | Ex. 2 / Ex. 17 | 6.1 / 2.2 | | | 0.5 | 150 | 15 min | 30 min. |
| 110 | do | 5 | Ex. 2 / Ex. 17 | 6.1 / 3.3 | | | 0.5 | 150 | 15 min | 30 min. |
| 111 | Epon 1004 | 5 | Ex. 4 / Ex. 17 | 2.1 / 0.7 | | | 0.5 | 150 | 15 min | 9 hr. |
| 112 | do | 5 | Ex. 9 / Ex. 17 | 1.9 / 0.7 | | | 0.5 | 150 | 15 min | 8 hr. 30 min. |
| 113 | Epon 1007 | 5 | Ex. 2 / Ex. 17 | 1.2 / 0.6 | | | 0.5 | 150 | 15 min | 2 hr. 30 min. |
| 114 | do | 5 | Ex. 2 / Ex. 17 | 1.2 / 0.3 | | | 0.5 | 150 | 15 min | 8 hr. |
| 115 | do | 5 | Ex. 5 / Ex. 17 | 1.2 / 0.6 | | | 0.5 | 150 | 15 min | 9 hr. |
| 116 | do | 5 | Ex. 5 / Ex. 17 | 1.2 / 1.2 | | | 0.5 | 150 | 15 min | 8 hr. |
| 117 | do | 5 | Ex. 1 / Ex. 17 | 2.0 / 0.7 | | | 0.5 | 150 | 15 min | 6 hr. |
| 118 | Ex. 18 | 5 | Ex. 3 / Ex. 13 | 6.8 / 2.4 | | | 0.5 | 150 | 3 hr | 15 min. |
| 119 | Ex. 18 | 5 | Ex. 4 / Ex. 13 | 7.4 / 1.2 | | | 0.5 | 150 | 15 min | 30 min. |
| 120 | Ex. 18 | 5 | Ex. 5 / Ex. 13 | 8.7 / 2.6 | | | 0.5 | 150 | 12 hr | 30 min. |
| 121 | Ex. 18 | 5 | Ex. 9 / Ex. 13 | 6.6 / 1.1 | | | 0.5 | 150 | 3 hr | 5 hr. |
| 122 | Ex. 19 | 5 | Ex. 2 / Ex. 13 | 4.5 / 2.8 | | | 0.5 | 150 | 3 hr | 1 hr. |
| 123 | Ex. 19 | 5 | Ex. 3 / Ex. 13 | 3.7 / 0.8 | | | 0.5 | 150 | 12 hr | 30 min. |
| 124 | Ex. 19 | 5 | Ex. 4 / Ex. 13 | 4.1 / 1.8 | | | 0.5 | 150 | 10 hr | 30 min. |
| 125 | Ex. 19 | 5 | Ex. 5 / Ex. 13 | 4.8 / 0.5 | | | 0.5 | 150 | 15 hr | 30 min. |
| 126 | Ex. 19 | 5 | Ex. 9 / Ex. 13 | 3.7 / 1.7 | | | 0.5 | 150 | 3 hr | 45 min. |
| 127 | Ex. 18 | 5 | Ex. 2 / Ex. 14 | 8.1 / 1.3 | | | 0.5 | 150 | 3 hr | 15 min. |
| 128 | Ex. 19 | 5 | Ex. 2 / Ex. 14 | 4.5 / 2.7 | | | 0.5 | 150 | 30 min | 15 min. |
| 129 | Ex. 19 | 5 | Ex. 9 / Ex. 14 | 3.7 / 0.8 | | | 0.5 | 150 | 2 hr. 45 min | 15 min. |
| 130 | Ex. 18 | 5 | Ex. 5 / Ex. 15 | 8.7 / 1.3 | | | 0.5 | 150 | 12 hr | 15 min. |
| 131 | Ex. 19 | 5 | Ex. 3 / Ex. 15 | 3.7 / 2.4 | | | 0.5 | 150 | 1 hr. 30 min | 15 min. |
| 132 | Ex. 19 | 5 | Ex. 4 / Ex. 15 | 4.1 / 0.9 | | | 0.5 | 150 | 2 hr | 15 min. |
| 133 | Ex. 19 | 5 | Ex. 5 / Ex. 15 | 4.8 / 2.7 | | | 0.5 | 150 | 3 hr | 15 min. |
| 134 | Ex. 18 | 5 | Ex. 9 / Ex. 16 | 6.6 / 1.1 | | | 0.5 | 175 | 1 hr. 45 min | 1 hr. |
| 135 | Ex. 19 | 5 | Ex. 2 / Ex. 16 | 4.5 / 0.9 | | | 0.5 | 175 | 9 hr | 1 hr. |
| 136 | Ex. 18 | 5 | Ex. 2 / Ex. 17 | 8.1 / 1.3 | | | 0.5 | 150 | 15 min | 15 min. |
| 137 | Ex. 19 | 5 | Ex. 2 / Ex. 17 | 4.5 / 2.8 | | | 0.5 | 150 | 4 hr | 15 min. |
| 138 | Ex. 19 | 5 | Ex. 9 / Ex. 17 | 3.7 / 1.7 | | | 0.5 | 150 | 4 hr | 15 min. |
| 139 | Ex. 22 | 5 | Ex. 1 / Ex. 15 | 26.9 / 3.1 | | | 0.5 | 175 | 3 hr. 30 min | 30 min. |
| 140 | Ex. 22 | 5 | Ex. 5 / Ex. 15 | 16.7 / 4.0 | | | 0.5 | 175 | 20 min | 30 min. |
| 141 | Ex. 22 | 5 | Ex. 9 / Ex. 16 | 12.8 / 1.7 | | | 0.5 | 175 | 1 hr. 15 min | 45 min. |
| 142 | Ex. 21 | 5 | Ex. 9 / Ex. 16 | 2.0 / .7 | | | 0.5 | 175 | 15 min | 15 min. |
| 143 | Ex. 21 | 5 | Ex. 2 / Ex. 13 | 2.5 / 1.6 | | | 0.5 | 175 | 45 min | 1 hr. |
| 144 | Ex. 21 | 5 | Ex. 3 / Ex. 15 | 1.2 / 1.4 | | | 0.5 | 175 | 20 min | 3 hr. |
| 145 | Ex. 21 | 5 | Ex. 5 / Ex. 15 | 2.7 / .7 | | | 0.5 | 175 | 1 hr | 5 hr. |
| 146 | Ex. 21 | 5 | Ex. 4 / Ex. 14 | 2.3 / 2.1 | | | 0.5 | 175 | 10 min | 30 min. |
| 147 | Ex. 21 | 5 | Ex. 1 / Ex. 13 | 4.3 / .5 | | | 0.5 | 175 | 1 hr. 30 min | 20 min. |
| 148 | Ex. 21 | 5 | Ex. 9 / Ex. 17 | 2.0 / 1.4 | | | 0.5 | 175 | 1 hr | 2 hr. 15 min. |
| 149 | Ex. 23 | 5 | Ex. 3 / Ex. 14 | 11.4 / 3.2 | | | 0.5 | 175 | 8 hr | 10 min. |
| 150 | Ex. 23 | 5 | Ex. 4 / Ex. 15 | 12.5 / 1.7 | | | 0.5 | 175 | 5 hr | 10 min. |
| 151 | Ex. 23 | 5 | Ex. 4 / Ex. 13 | 6.3 / 3.3 | | | 0.5 | 175 | 1 hr | 6 hr. 30 min. |

| Example No. | Polyepoxide | Parts | Aldehyde condensate | Parts | Catalyst Type | Catalyst Parts | Conversion Time (hrs.) | Conversion Temp. (°C.) | Film resistance H₂O at (100°C.) | Film resistance Hours 5% aqueous NaOH (at 25°C.) |
|---|---|---|---|---|---|---|---|---|---|---|
| 152 | Ex. 23 | 5 | Ex. 1 / Ex. 15 | 5.6 / 1.1 | | | 0.5 | 175 | 11 hr. 45 min. | 1 hr. 15 min. |
| 153 | Ex. 23 | 5 | Ex. 9 / Ex. 16 | 11.7 / 1.6 | | | 0.5 | 175 | 3 hr. | 3 hr. |
| 154 | Ex. 23 | 5 | Ex. 2 / Ex. 17 | 6.9 / .5 | | | 0.5 | 175 | 1 hr. | 1 hr. 15 min. |
| 155 | Ex. 23 | 5 | Ex. 1 / Ex. 17 | 5.6 / 2.0 | | | 0.5 | 175 | 2 hr. | 30 min. |
| 156 | Ex. 24 | 1 | Ex. 3 / Ex. 17 | 1.7 / .5 | | | 0.5 | 175 | 20 min. | 2 hr. 15 min. |
| 157 | Ex. 24 | 1 | Ex. 5 / Ex. 14 | 2.2 / .5 | | | 0.5 | 175 | 30 min. | 3 hr. 15 min. |
| 158 | Ex. 24 | 1 | Ex. 9 / Ex. 17 | 2.0 / .9 | | | 0.5 | 175 | 8 hr. | 20 min. |
| 159 | Epon 1001 | 1.5 | Ex. 6 | 1.5 | NaOMe | 0.28 | 1.0 | 175 | 5 min. | 2 hr. |
| 160 | Epon 562 | 2.0 | Ex. 6 | 1.0 | NaOMe | 0.28 | 0.5 | 175 | 10 min. | 20 min. |
| 161 | Epon 1001 | 1.5 | Ex. 7 | 1.0 | BF₃-Et₂O | 0.10 | 0.5 | 200 | 16+ hr. | 50+ hr. |
| 162 | Epon 1004 | 0.5 | Ex. 7 | 1.0 | BF₃-Et₂O | 0.10 | 0.5 | 200 | 13 hr. | 1 hr. |
| 163 | Epon 1001 | 1.5 | Ex. 7 | 1.0 | | | 0.5 | 200 | 16+ hr. | 50+ hr. |
| 164 | Epon 1004 | 0.5 | Ex. 7 | 1.0 | NaOMe | 0.10 | 0.5 | 200 | 16+ hr. | 2 hr. 30 min. |
| 165 | Epon 1001 | 1.0 | Ex. 8 | 0.5 | NaOMe | 0.10 | 0.5 | 200 | 16+ hr. | 50+ hr. |
| 166 | Epon 562 | 1.0 | Ex. 8 | 1.0 | NaOMe | 0.10 | 0.5 | 200 | 16+ hr. | 2 hr. |
| 167 | Epon 1004 | 2.0 | Ex. 6 / Ex. 13 | 1.5 / 1.0 | NaOMe | 0.84 | 0.5 | 175 | 30 min. | 20 hr. |
| 168 | Epon 1001 | 0.5 | Ex. 6 / Ex. 14 | 1.0 / 0.25 | NaOMe | 0.32 | 0.5 | 175 | 20 min. | 10 min. |
| 169 | Epon 562 | 0.5 | Ex. 6 / Ex. 17 | 1.0 / 2.0 | NaOMe | 0.6 | 1.0 | 200 | 1 hr. | 5 min. |
| 170 | Epon 1001 | 0.75 | Ex. 7 / Ex. 13 | 1.0 / 2.0 | | | 0.5 | 200 | 16+ hr. | 24 hr. |
| 171 | Epon 562 | 0.5 | Ex. 7 / Ex. 14 | 1.0 / 1.0 | NaOMe | 0.1 | 0.5 | 200 | 5 hr. | 20 min. |
| 172 | Epon 562 | 0.5 | Ex. 8 / Ex. 13 | 1.0 / 1.0 | | | 0.5 | 200 | 16+ hr. | 10 min. |
| 173 | Epon 1004 | 0.5 | Ex. 8 / Ex. 14 | 1.0 / 0.5 | | | 0.5 | 200 | 4 hr. 30 min. | 10 min. |

It will be appreciated that the flexibility of the conversion products of this invention may be controlled by proportioning the reactants used, and by the addition of varying amounts of plasticizers. Typical lacquer type plasticizers having polar characteristics such as the sulfonamide plasticizers and certain polyester plasticizers are suitable for admixture with the reaction mixtures to obtain the desired flexibility.

Examples 174 through 186 illustrate the preparation of hard conversion products which may be used for the preparation of flexible coating films upon the addition of suitable plasticizers. The reactants were used as 50% nonvolatile methyl ethyl ketone solutions, and the parts referred to in the examples are parts by weight based on nonvolatile content.

*Example 174*

A reaction mixture was prepared by admixing 10 parts of Epon resin 864, 80 parts of the condensate of Example 9, and 10 parts of condensate of Example 15. The mixture was spread in wet films of .002" thickness and the films were then cured by baking them at 175° C. for a period of 30 minutes to form converted products which were insoluble and infusible.

*Example 175*

A reaction mixture was prepared by admixing 10 parts of Epon resin 864, 10 parts of the condensate of Example 3, and 80 parts of the condensate of Example 14. The mixture was spread in wet films of .002" thickness and the films were then cured by baking them at 175° C. for a period of 30 minutes to form converted products which were insoluble and infusible.

*Example 176*

A reaction mixture was prepared by admixing 25 parts of Epon resin 864, 25 parts of the condensate of Example 3, and 50 parts of the condensate of Example 15. The mixture was spread in wet films of .002" thickness and the films were then cured by baking them at 175° C. for a period of 30 minutes to form converted products which were insoluble and infusible.

*Example 177*

A reaction mixture was prepared by admixing 80 parts of the polyepoxide polyester of Example 19, 5 parts of the condensate of Example 2, and 15 parts of the condensate of Example 13. The mixture was spread in wet films of .002" thickness and the films were then cured by baking them for 30 minutes at a temperature of 175° C. to form converted products which were insoluble and infusible.

*Example 178*

A reaction mixture was prepared by admixing 15 parts of the polyepoxide polyester of Example 19, 80 parts of the condensate of Example 9 and 5 parts of the condensate of Example 13. The mixture was spread in wet films of .002" thickness and the films were then cured by baking them for 30 minutes at a temperature of 175° C. to form converted products which were insoluble and infusible.

*Example 179*

A reaction mixture was prepared by admixing 5 parts of the polyepoxide polyester of Example 18, 15 parts of the condensate of Example 5 and 80 parts of the condensate of Example 14. The mixture was spread in wet films of .002" thickness and the films were then cured by baking them for 30 minutes at a temperature of 175° C. to form converted products which were insoluble and infusible.

*Example 180*

A reaction mixture was prepared by admixing 25 parts of the polyepoxide polyester of Example 18, 25 parts of the condensate of Example 4 and 50 parts of the condensate of Example 15. The mixture was spread in wet films of .002" thickness and the films were then cured by baking them for 30 minutes at a temperature of 175° C. to form converted products which were insoluble and infusible.

*Example 181*

A reaction mixture was prepared by admixing 10 parts of the epoxide of Example 21, 5 parts of the phenol-aldehyde condensate of Example 5, and 85 parts of the ammonia derivative-aldehyde condensate of Example 15. The mixture was spread in wet films of .002" thickness and the films were then cured by baking them at 175° C. for a period of 30 minutes to form converted products which were insoluble and infusible.

*Example 182*

A reaction mixture was prepared by admixing 25 parts of the epoxide of Example 22, 25 parts of the phenol-aldehyde condensate of Example 2, and 50 parts of the ammonia derivative-aldehyde condensate of Example 14. The mixture was spread in wet films of .002" thickness and the films were then cured by baking them at 175° C. for a period of 30 minutes to form converted products which were insoluble and infusible.

*Example 183*

A reaction mixture was prepared by admixing 80 parts of the polyepoxide of Example 24, 10 parts of the condensate of Example 9, and 10 parts of the condensate of Example 14. The mixture was spread in wet films of .002" thickness and the films were then cured by baking them at 175° C. for a period of 30 minutes to form converted products which were insoluble and infusible.

*Example 184*

A reaction mixture was prepared by admixing 15 parts of the polyepoxide of Example 24, 80 parts of the condensate of Example 9, and 5 parts of the condensate of Example 14. The mixture was spread in wet films of .002" thickness and the films were then curved by baking the mat 175° C. for a period of 30 minutes to form converted products which were insoluble and infusible.

*Example 185*

A reaction mixture was prepared by admixing 25 parts of the polyepoxide of Example 24, 25 parts of the condensate of Example 5, and 50 parts of the condensate of Example 15. The mixture was spread in wet films of .002" thickness and the films were then cured by baking them at 175° C. for a period of 30 minutes to form converted products which were insoluble and infusible.

*Example 186*

A reaction mixture was prepared by admixing 10 parts of the polyepoxide of Example 23, 10 parts of the condensate of Example 3, and 80 parts of the condensate of Example 15. The mixture was spread in wet films of .002" thickness and the films were then cured by baking them at 175° C. for a period of 30 minutes to form converted products which were insoluble and infusible.

It should be appreciated that the invention is not to be construed to be limited by the illustration examples. It is possible to produce still other embodiments without departing from the inventive concept herein disclosed. This application is a continuation-in-part of the Greenlee copending applications S.N. 534,407 and 550,766, filed September 14, 1955, and December 2, 1955, respectively, now abandoned.

It is claimed and desired to secure by Letters Patent:

1. A composition of matter comprising the condensation product obtained by heating (A) an organic polyepoxide having an average of more than one epoxide group per molecule wherein the epoxy oxygen atom is linked to adjacent carbon atoms and (B) a polycarboxylic acid which is a fusible condensate of (a) a low molecular weight mono-aldehyde and (b) a 4,4-bis(hydroxyaryl)pentanoic acid wherein the hydroxyaryl radical is a member of the group consisting of unsubstituted hydroxyphenyl and ring substituted hydroxyphenyl wherein the hydroxy group of said member is in a position other than one meta to the point of attachment of said member to the pentanoic acid, any substituent on the hydroxyphenyl being a member selected from the group consisting of chloro, bromo, nitro and alkyl groups of from 1–5 carbon atoms, with said hydroxyphenyl radical having hydrogen on at least one position other than one meta, in relation to the hydroxy group wherein the ratio of (a) to (b) is from 0.5–4 moles of (a) per mole of (b); and wherein the reactive functional groups of (A) and (B) are present in an equivalent ratio of from 6:1 to 1:6.

2. The composition of claim 1 wherein the pentanoic acid is 4,4-bis(4-hydroxyphenyl)pentanoic acid.

3. The composition of claim 1 wherein the pentanoic acid is a 4,4-bis(4-hydroxy, alkylphenyl)pentanoic acid.

4. The composition of claim 1 wherein said polyepoxide (A) is a complex epoxide which is a polymeric polyhydric alcohol having alternating aliphatic chains and aromatic nuclei united through ether oxygen and terminating in epoxy-substituted aliphatic chains.

5. The composition of matter of claim 1 wherein said polyepoxide (A) is an epoxidized polyester of tetrahydrophthalic acid and a glycol, wherein the epoxy oxygen atoms are each linked to adjacent carbon atoms in the nucleus of said acid.

6. The composition of matter of claim 1 wherein said polyepoxide (A) is an epoxidized ester of an unsaturated natural fatty oil acid containing about 15–22 carbon atoms, and having its reactive groups selected from the class consisting of epoxy and hydroxy.

7. The composition of matter of claim 1 wherein said polyepoxide (A) is an aliphatic polyepoxide selected from the group consisting of bis(glycidyloxy)butene, triglycidyl glyceryl ether, diepoxy butane, and diglycide ether.

8. The composition of claim 1 wherein the reactive functional groups of (A) and (B) are present in an equivalent ratio of from about 2:1 to 1:2.

9. A composition of matter comprising the condensation product obtained by heating (A) an organic polyepoxide having an average of more than one epoxide group per molecule wherein the epoxy oxygen atom is linked to adjacent carbon atoms, (B) a polycarboxylic acid which is a fusible condensate of (a) a low molecular weight mono-aldehyde and (b) a 4,4-bis(hydroxyaryl)pentanoic acid wherein the hydroxyaryl radical is a member of the group consisting of unsubstituted hydroxyphenyl and ring substituted hydroxyphenyl wherein the hydroxy group of said member is in a position other than one meta to the point of attachment of said member to the pentanoic acid, any substituent on the hydroxyphenyl being a member selected from the group consisting of chloro, bromo, nitro and alkyl groups of from 1–5 carbon atoms, with said hydroxyphenyl radical having hydrogen on at least one position other than one meta, in relation to the hydroxy group wherein the ratio of (a) to (b) is from 0.5–4 moles of (a) per mole of (b), and (C) a fusible condensate of a low molecular weight mono-aldehyde with at least one organic ammonia derivative selected from the group consisting of urea, thio-urea, melamine, toluenesulfonamide and alkyl substituted derivatives thereof, wherein the reactive functional groups of (A) and (B+C) are present in an equivalent ratio of from about 6:1 to 1:6 with (C) constituting no more than 80% of (B+C).

10. A composition of matter comprising the condensation product obtained by heating (A) an organic polyepoxide having an average of more than one epoxide group per molecule wherein the epoxy oxygen atom is linked to adjacent carbon atoms, (B) a polycarboxylic acid which is a fusible condensate of (a) a low molecular weight mono-aldehyde and (b) a 4,4-bis(hydroxyaryl)pentanoic acid wherein the hydroxyaryl radical is a member of the group consisting of unsubstituted hydroxyphenyl and ring substituted hydroxyphenyl wherein the hydroxy group of said member is in a position other than one meta to the point of attachment of said member to the pentanoic acid, any substituent on the hydroxyphenyl being a member selected from the group consisting of chloro, bromo, nitro and alkyl groups of from 1–5 carbon atoms, with said hydroxyphenyl radical having hydrogen on at least one position other than one meta, in relation to the hydroxy group wherein the ratio of (a) to (b) is from 0.5–4 moles of (a) per mole of (b), and (C) a fusible condensate of a low molecular weight mono-aldehyde with a phenol, wherein the reactive functional groups of (A) and (B+C) are present in an equivalent ratio of from about 6:1 to 1:6 with (C) constituting no more than 80% of (B+C).

References Cited in the file of this patent

UNITED STATES PATENTS

| | | |
|---|---|---|
| 1,923,321 | Meigs | Aug. 22, 1933 |
| 2,521,911 | Greenlee | Sept. 12, 1950 |
| 2,528,360 | Greenlee | Oct. 31, 1950 |
| 2,699,413 | Seagren et al. | Jan. 11, 1955 |

OTHER REFERENCES

Bader et al.: J. Am. Chem. Soc. 76, 4465–6 (1954). (Copy in Scientific Library.)

UNITED STATES PATENT OFFICE
CERTIFICATE OF CORRECTION

Patent No. 2,907,729                                            October 6, 1959

Sylvan Owen Greenlee

It is hereby certified that error appears in the printed specification of the above numbered patent requiring correction and that the said Letters Patent should read as corrected below.

Column 2, lines 5, 11, 41, and column 3, lines 41 and 42, for "diphenolic acid", each occurrence, read — Diphenolic Acid —; columns 9 and 10, equation designated as "IV" appearing as:

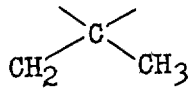          should read          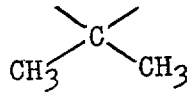

column 13, lines 22 and 43, for "alkyl", in each occurrence, read — alkyd —; column 14, line 21, for "the room" read — to room —; column 16, line 32, for "usually" read — unusually —; column 23, line 33, for "curved" read — cured —; line 34, for "the mat" read — them at —;

Signed and sealed this 17th day of May 1960.

(SEAL)
Attest:

KARL H. AXLINE
Attesting Officer

ROBERT C. WATSON
Commissioner of Patents